(12) United States Patent
White

(10) Patent No.: US 11,754,371 B2
(45) Date of Patent: Sep. 12, 2023

(54) REAL TIME AIMING ASSEMBLY

(71) Applicant: James White, Los Angeles, CA (US)

(72) Inventor: James White, Los Angeles, CA (US)

( * ) Notice: Subject to any disclaimer, the term of this patent is extended or adjusted under 35 U.S.C. 154(b) by 133 days.

(21) Appl. No.: 17/523,624

(22) Filed: Nov. 10, 2021

(65) Prior Publication Data

US 2023/0148219 A1 May 11, 2023

(51) Int. Cl.
*F41G 3/00* (2006.01)
*F41G 3/16* (2006.01)
*F41G 3/26* (2006.01)
*G02B 27/00* (2006.01)
*G02B 27/01* (2006.01)

(52) U.S. Cl.
CPC ............ *F41G 3/165* (2013.01); *F41G 3/2611* (2013.01); *G02B 27/0093* (2013.01); *G02B 27/0172* (2013.01); *G02B 27/0176* (2013.01); *G02B 27/0179* (2013.01); *G02B 2027/0178* (2013.01); *G02B 2027/0187* (2013.01)

(58) Field of Classification Search
CPC ... F41G 3/165; F41G 3/2611; G02B 27/0093; G02B 27/0172; G02B 27/0176; G02B 27/0179; G02B 2027/0178; G02B 2027/0187
USPC .......................................................... 235/404
See application file for complete search history.

(56) References Cited

U.S. PATENT DOCUMENTS

| 6,739,873 | B1 | 5/2004 | Rod |
| D555,703 | S | 11/2007 | Damen |
| 7,318,646 | B2 | 1/2008 | Bernard |
| 8,418,395 | B2 | 4/2013 | Summers |
| 8,833,655 | B2 | 9/2014 | McCarty |
| 9,091,507 | B2 | 7/2015 | Paterson |
| 11,280,585 | B2 * | 3/2022 | Lyren ........................ F41G 3/12 |
| 2004/0021950 | A1 | 2/2004 | Norton |
| 2020/0049458 | A1 * | 2/2020 | Lyren ........................ F41G 3/06 |

FOREIGN PATENT DOCUMENTS

WO    WO2007076291    7/2007

* cited by examiner

*Primary Examiner* — Daniel A Hess

(57) ABSTRACT

A real time aiming assembly includes a firearm that has a barrel and a grip. A firearm motion sensor is integrated into the firearm and the firearm motion sensor is calibrated to sense a firing axis of the barrel to determine the target of the firearm. A pair of glasses is wearable on a user's face and a glasses motion sensor is integrated into the pair of glasses. The glasses motion sensor is calibrated to sense a viewing axis of the pair of glasses to determine the line of the user. A display unit is integrated into the glasses and the display unit is in communication with the glasses motion sensor. The display unit projects a dot onto a respective one of the lenses to display precisely where the bullet fired from the firearm will strike.

7 Claims, 5 Drawing Sheets

REAL TIME AIMING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to aiming devices and more particularly pertains to a new aiming device for projecting an aiming dot onto an article of eyewear. The device includes a firearm motion sensor integrated into a firearm and a glasses motion sensor integrated into a pair of glasses. The device includes a display unit that is integrated into the glasses and which projects a dot onto a respective lens of the glasses to aiming the firearm.

(2) Description of Related Art Including Information Disclosed Under 37 CFR 1.97 and 1.98

The prior art relates to aiming devices including a shooting training device that includes a camera which views a target, a camera integrated into an article of eyewear and a camera integrated into a firearm for remotely viewing a real time aiming video of a shooter. The prior art discloses a transparent display device integrated into a lens of eyewear for projecting images into the line of sight of a user. The prior art discloses an aiming device which includes a collimator that is adhered to a lens of an article of eyewear with assisting with aiming a firearm. The prior art discloses a variety of rifle scope devices which has electronic circuitry for determining an aiming point of a firearm. The prior art discloses a rangefinder that is integrated into a lens of an article of eyewear.

BRIEF SUMMARY OF THE INVENTION

An embodiment of the disclosure meets the needs presented above by generally comprising a firearm that has a barrel and a grip. A firearm motion sensor is integrated into the firearm and the firearm motion sensor is calibrated to sense a firing axis of the barrel to determine the target of the firearm. A pair of glasses is wearable on a user's face and a glasses motion sensor is integrated into the pair of glasses. The glasses motion sensor is calibrated to sense a viewing axis of the pair of glasses to determine the line of the user. A display unit is integrated into the glasses and the display unit is in communication with the glasses motion sensor. The display unit projects a dot onto a respective one of the lenses to display precisely where the bullet fired from the firearm will strike.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
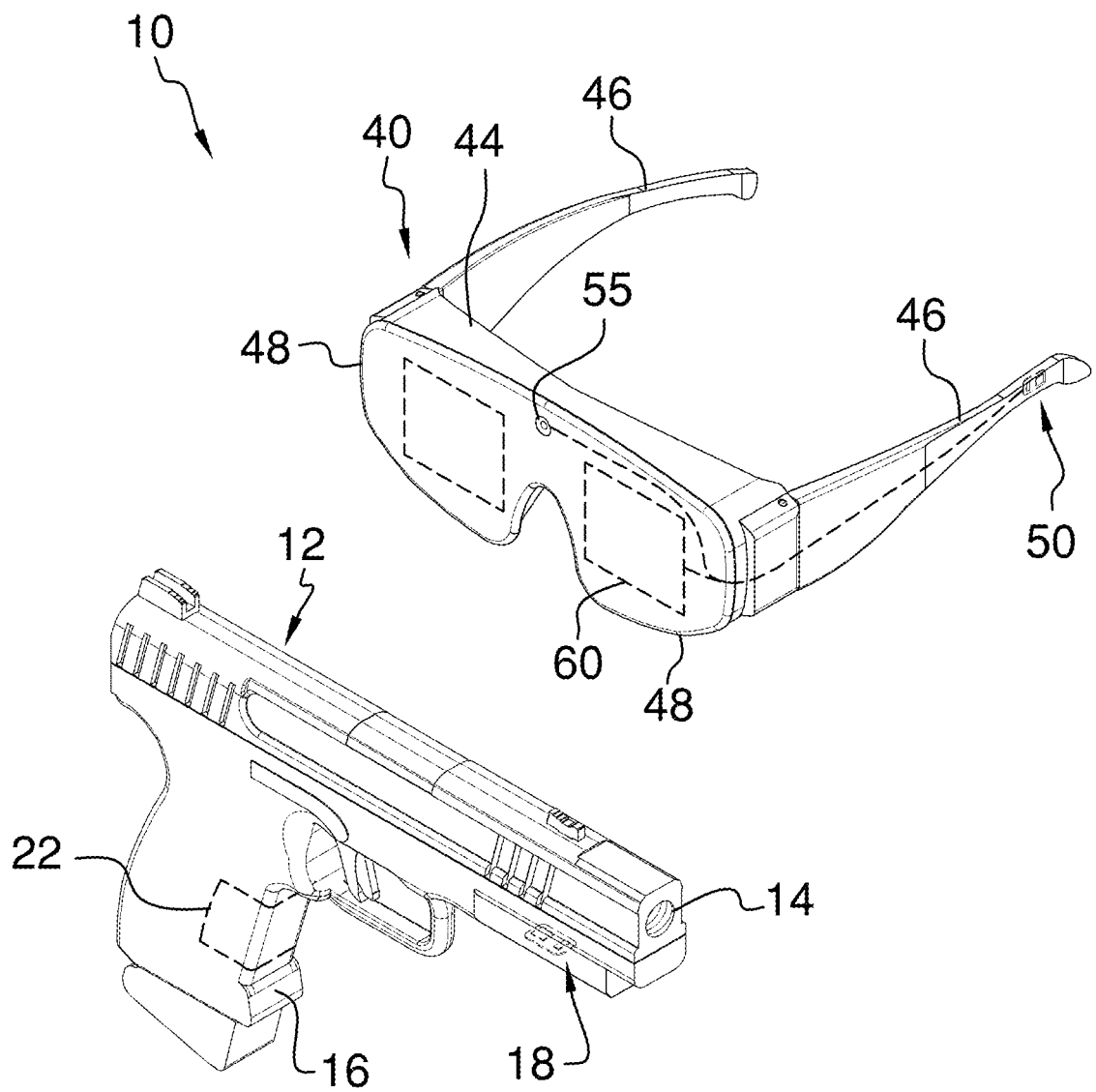
FIG. 1 is a perspective phantom view of a real time aiming assembly according to an embodiment of the disclosure.
Figure 2:
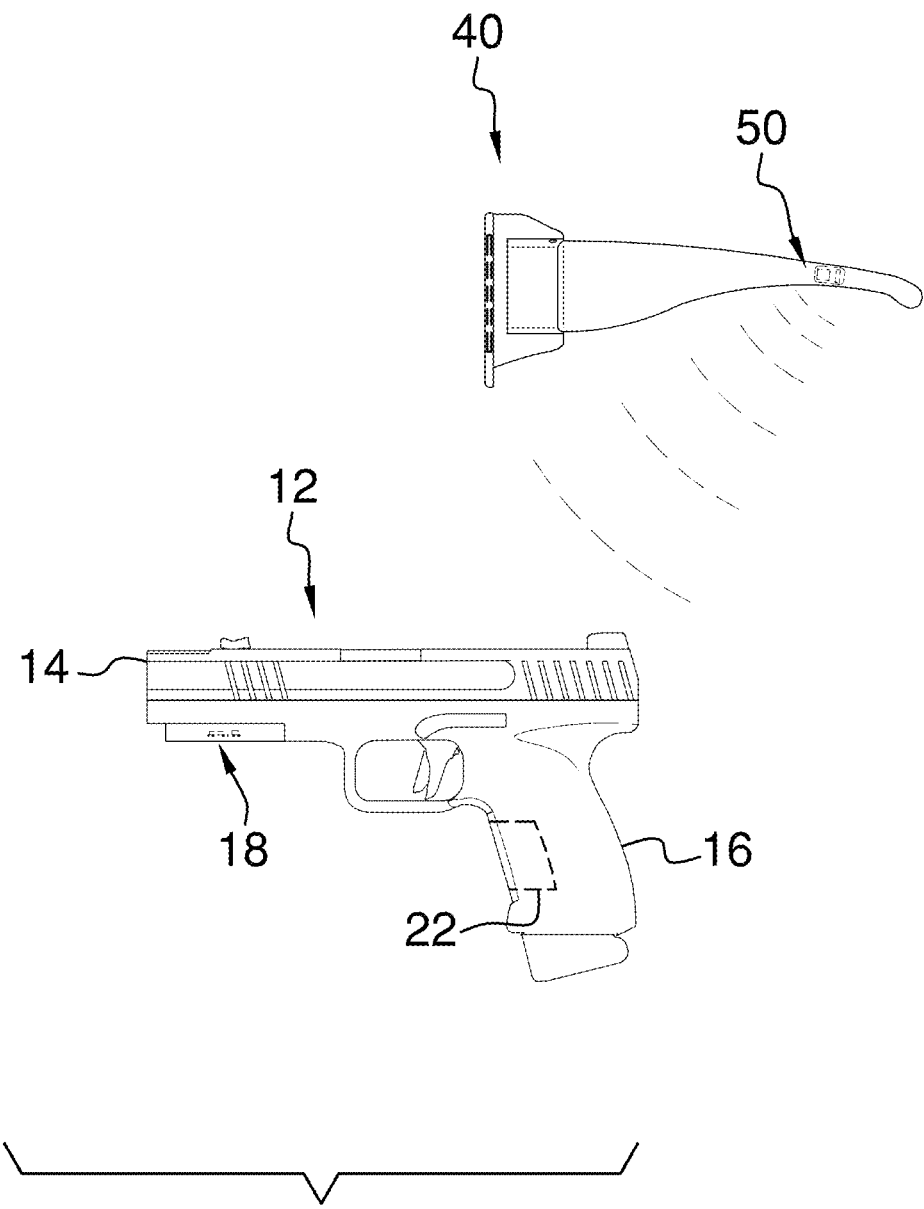
FIG. 2 is a left side phantom view of an embodiment of the disclosure.
Figure 3:
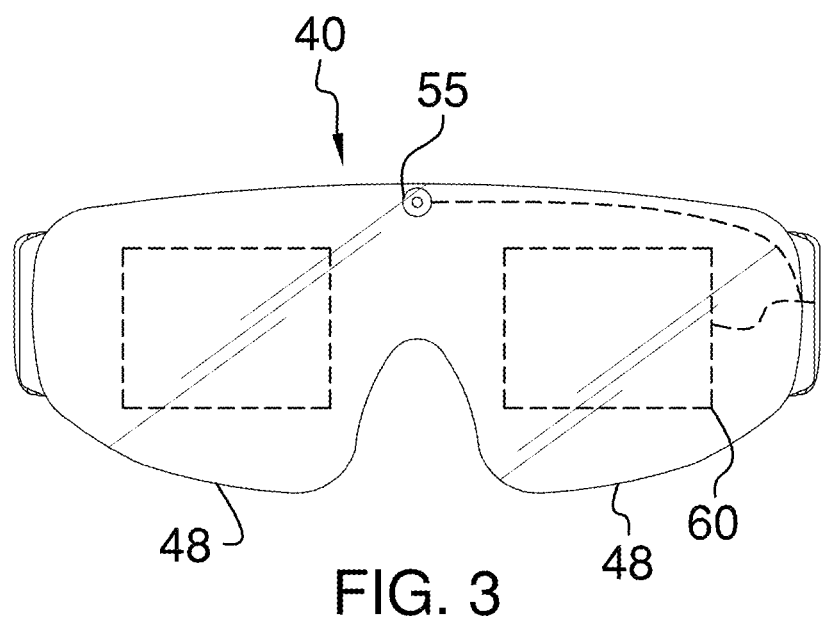
FIG. 3 is a front phantom view of an embodiment of the disclosure.
Figure 4:
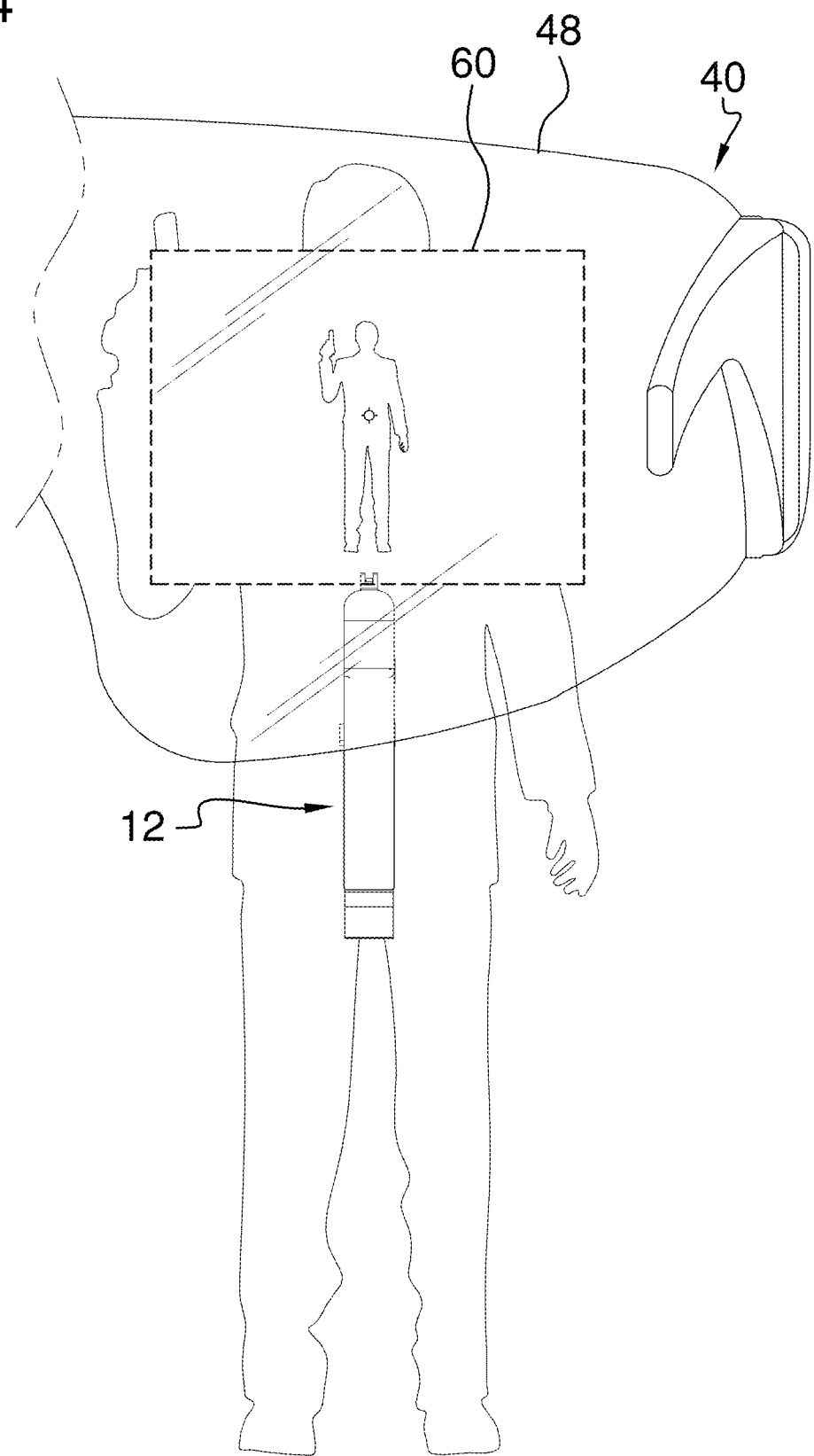
FIG. 4 is a perspective in-use view of an embodiment of the disclosure.
Figure 5:
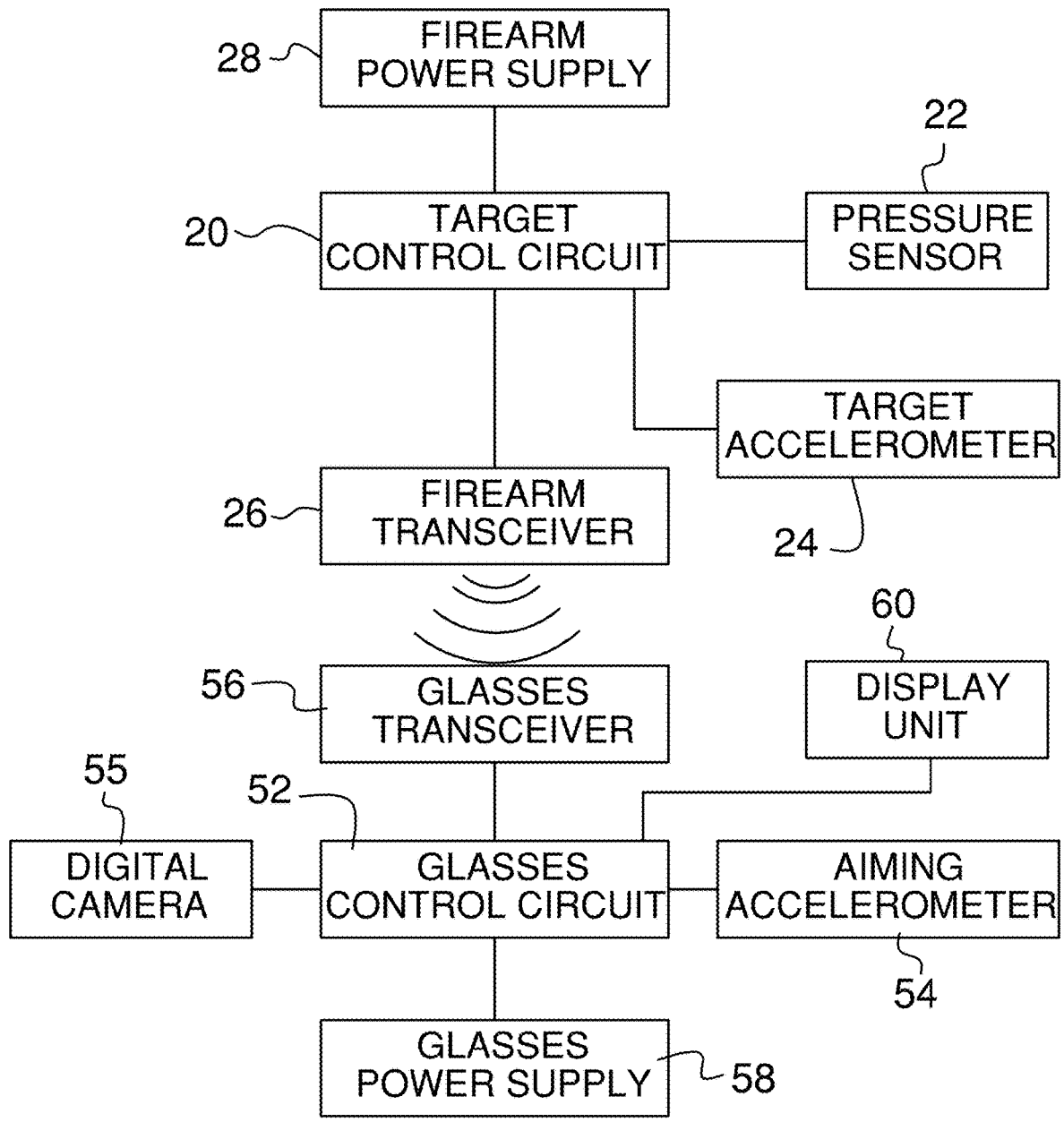
FIG. 5 is a schematic view of an embodiment of the disclosure.

With reference now to the drawings, and in particular to FIGS. 1 through 5 thereof, a new aiming device embodying the principles and concepts of an embodiment of the disclosure and generally designated by the reference numeral 10 will be described.

As best illustrated in FIGS. 1 through 5, the real time aiming assembly 10 generally comprises a firearm 12 that has a barrel 14 and a grip 16. The firearm 12 may be a handgun of any conventional design, including semi-automatic handguns and revolvers. A firearm motion sensor 18 is provided and the firearm motion sensor 18 is integrated into the firearm 12. The firearm motion sensor 18 is calibrated to sense a firing axis of the barrel 14 to determine the target of the firearm 12. The firearm motion 18 sensor may be positioned on a lower side of a slide of the semi-automatic handgun and the firearm motion sensor 18 may be positioned on a lower side of a barrel of the revolver. The firearm motion sensor 18 comprises a target control circuit 20 that is integrated into the firearm 12. The firearm motion sensor 18 includes a pressure sensor 22 that is integrated into the grip 16 to sense when the user is gripping the grip 16 for operating the firearm 12. The pressure sensor 22 is electrically coupled to the target control circuit 20 and the pressure sensor 22 may comprise an electronic pressure sensor with a trigger pressure of approximately 250.0 grams. Additionally, the target control circuit 20 is turned on when the pressure sensor 22 senses the trigger pressure.

The firearm motion sensor 18 includes a target accelerometer 24 that is integrated into the firearm 12 and the target accelerometer 24 senses acceleration about nine different axis. The target accelerometer 24 is electrically coupled to the target control circuit 20 and the target control circuit 20 analyzes acceleration data from the target accelerometer 24 to generate a target signal. In this way the target control circuit 20 can determine where a bullet fired from the firearm 12 will strike. The firearm motion sensor 18 includes a firearm transceiver 26 that is integrated into the firearm 12 and the firearm transceiver 26 is electrically coupled to the target control circuit 20. The firearm transceiver 26 broadcasts the targeting signal received from the target control circuit 20, and the firearm transceiver 26 may comprise a radio frequency transceiver or the like. The firearm motion sensor 18 includes a firearm power supply 28 which is integrated into the firearm 12. The firearm power supply 28 is electrically coupled to the target control circuit 20 and the firearm power supply 28 comprises at least one battery.

A pair of glasses 40 is provided that are wearable on a user's face. The pair of glasses 40 has a frame 44, a pair of temples 46 and a pair of lenses 48. Each of the lenses 48 is comprised of a translucent material to facilitate the user to see through the lenses 48. The pair of glasses 40 may comprise safety glasses that are commonly worn on a shooting range, for example, or other eyewear that would commonly be worn while operating a firearm. A glasses motion sensor 50 is integrated into the pair of glasses 40 and the glasses motion sensor 50 is calibrated to sense a viewing axis of the pair of glasses 40. In this way the glasses motion sensor 50 can determine the line of the user.

The glasses motion sensor 50 comprises a glasses control circuit 52 that is integrated into the frame 44. The glasses motion sensor 50 includes an aiming accelerometer 54 that is integrated into the frame 44 and the aiming accelerometer 54 senses acceleration about nine different axis. The aiming accelerometer 54 is electrically coupled to the glasses control circuit 52 and the glasses control circuit 52 analyzes acceleration data from the aiming accelerometer 54 to generate a viewing signal. In this way the glasses control circuit 52 determines the line of sight of the user when the user is wearing the glasses 40. A digital camera 55 may be integrated into the frame 44 of pair of glasses 40 and the digital camera 55 may be electrically coupled to the glasses control circuit 52. The glasses control circuit 52 may employ imagery captured by the digital camera 55 for determining the line of sight of the user.

The glasses motion sensor 50 includes a glasses transceiver 56 that is integrated into the frame 44 and the glasses transceiver 56 is electrically coupled to the glasses control circuit 52. The glasses transceiver 56 is in wireless communication with the firearm transceiver 26 such that the glasses transceiver 56 receives the targeting signal. Furthermore, the glasses control circuit 52 compares the targeting signal with the viewing signal to determine a target of the firearm 12. The glasses transceiver 56 may comprise a radio frequency transceiver or the like and the glasses transceiver 56 may have an operational frequency that is calibrated to the operational frequency of the firearm transceiver 26. The glasses motion sensor 50 includes a glasses power supply 58 that is integrated into the frame 44. The glasses power supply 58 is electrically coupled to the glasses control circuit 52 and the glasses power supply 58 comprises at least one rechargeable battery.

A display unit 60 is integrated into the glasses 40 and the display unit 60 is in communication with the glasses motion sensor 50. The display unit 60 projects a dot onto a respective one of the lenses 48 having the dot corresponding to the viewing axis of the glasses 40. In this way the display unit 60 can display precisely where the bullet fired from the firearm 12 will strike. The display unit 60 is integrated into a respective one of the lenses 48 and the display unit 60 is comprised of translucent material. In this way the display unit 60 facilitates the user to see through the display unit 60. The display unit 60 is electrically coupled to the glasses control circuit 52 and the display unit 60 displays the dot at a location which corresponds to the target of the firearm 12 which was determined by the glasses control circuit 52. The display unit 60 may comprise a translucent liquid crystal display or other type of electronic display.

In use, the firearm transceiver 26 begins broadcasting the targeting signal when the pressure sensor 22 senses that the user is gripping the grip 16. The display unit 60 displays the dot at a location on the respective lens 48 which corresponds to the aiming of the firearm 12. In this way the user can see precisely where the bullet that is fired from the firearm 12 will strike. Thus, the accuracy of firing the firearm 12 is increased as compared to firing the firearm 12 with conventional optics or sights.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A real time aiming assembly for displaying a targeting dot on an article of eyewear while operating a firearm, said assembly comprising:
   a firearm having a barrel and a grip;
   a firearm motion sensor being integrated into said firearm, said firearm motion sensor being calibrated to sense a firing axis of said barrel wherein said firearm motion sensor is configured to determine the target of said firearm;
   a pair of glasses being wearable on a user's face;
   a glasses motion sensor being integrated into said pair of glasses, said glasses motion sensor being calibrated to sense a viewing axis of said pair of glasses wherein said glasses motion sensor is configured to determine the line of said of the user;

a display unit being integrated into said glasses, said display unit being in communication with said glasses motion sensor, said display unit projecting a dot onto a respective one of said lenses having said dot corresponding to said viewing axis of said glasses wherein said display unit is configured to display precisely where the bullet fired from said firearm will strike.

2. The assembly according to claim 1, wherein said firearm motion sensor comprises:
    a target control circuit being integrated into said firearm;
    a pressure sensor being integrated into said grip wherein said pressure sensor is configured to sense when the user is gripping said grip for operating said firearm, said pressure sensor being electrically coupled to said target control circuit;
    a target accelerometer being integrated into said firearm, said target accelerometer sensing acceleration about nine different axis, said target accelerometer being electrically coupled to said target control circuit, said target control circuit analyzing acceleration data from said target accelerometer to generate a target signal wherein said target control circuit is configured to determine where a bullet fired from said firearm will strike;
    a firearm transceiver being integrated into said firearm, said firearm transceiver being electrically coupled to said target control circuit, said firearm transceiver broadcasting said targeting signal received from said target control circuit; and
    a firearm power supply being integrated into said firearm, said firearm power supply being electrically coupled to said target control circuit, said firearm power supply comprising at least one battery.

3. The assembly according to claim 2, wherein:
    said pair of glasses has a frame, a pair of temples and a pair of lenses, each of said lenses being comprised of a translucent material wherein said pair of lenses is configured to facilitate the user to see through said lenses; and
    said glasses motion sensor comprises:
        a glasses control circuit being integrated into said frame; and
        an aiming accelerometer being integrated into said frame, said aiming accelerometer sensing acceleration about nine different axis, said aiming accelerometer being electrically coupled to said glasses control circuit, said glasses control circuit analyzing acceleration data from said aiming accelerometer to generate a viewing signal wherein said glasses control circuit is configured to determine the line of sight of the user when the user is wearing said glasses.

4. The assembly according to claim 3, wherein:
    said firearm motion sensor includes a firearm transceiver, said firearm transceiver broadcasting a targeting signal; and
    said glasses motion sensor includes;
        a glasses transceiver being integrated into said frame, said glasses transceiver being electrically coupled to said glasses control circuit, said glasses transceiver being in wireless communication with said firearm transceiver such that said glasses transceiver receives said targeting signal, said glasses control circuit comparing said targeting signal with said viewing signal to determine a target of said firearm; and
        a glasses power supply being integrated into said frame, said glasses power supply being electrically coupled to said glasses control circuit, said glasses power supply comprising at least one rechargeable battery.

5. The assembly according to claim 4, wherein said display unit is integrated into a respective one of said lenses, said display unit being comprised of translucent material wherein said display unit is configured to facilitate the user to see through said display unit, said display unit being electrically coupled to said glasses control circuit, said display unit displaying said dot at a location which corresponds to said target of said firearm which was determined by said glasses control circuit.

6. A real time aiming assembly for displaying a targeting dot on an article of eyewear while operating a firearm, said assembly comprising:
    a firearm having a barrel and a grip;
    a firearm motion sensor being integrated into said firearm, said firearm motion sensor being calibrated to sense a firing axis of said barrel wherein said firearm motion sensor is configured to determine the target of said firearm, said firearm motion sensor comprising:
        a target control circuit being integrated into said firearm;
        a pressure sensor being integrated into said grip wherein said pressure sensor is configured to sense when the user is gripping said grip for operating said firearm, said pressure sensor being electrically coupled to said target control circuit;
        a target accelerometer being integrated into said firearm, said target accelerometer sensing acceleration about nine different axis, said target accelerometer being electrically coupled to said target control circuit, said target control circuit analyzing acceleration data from said target accelerometer to generate a target signal wherein said target control circuit is configured to determine where a bullet fired from said firearm will strike;
        a firearm transceiver being integrated into said firearm, said firearm transceiver being electrically coupled to said target control circuit, said firearm transceiver broadcasting said targeting signal received from said target control circuit; and
        a firearm power supply being integrated into said firearm, said firearm power supply being electrically coupled to said target control circuit, said firearm power supply comprising at least one battery;
    a pair of glasses being wearable on a user's face, said pair of glasses having a frame, a pair of temples and a pair of lenses, each of said lenses being comprised of a translucent material wherein said pair of lenses is configured to facilitate the user to see through said lenses;
    a glasses motion sensor being integrated into said pair of glasses, said glasses motion sensor being calibrated to sense a viewing axis of said pair of glasses wherein said glasses motion sensor is configured to determine the line of said of the user, said glasses motion sensor comprising:
        a glasses control circuit being integrated into said frame;
        an aiming accelerometer being integrated into said frame, said aiming accelerometer sensing acceleration about nine different axis, said aiming accelerometer being electrically coupled to said glasses control circuit, said glasses control circuit analyzing acceleration data from said aiming accelerometer to generate a viewing signal wherein said glasses control circuit is configured to determine the line of sight of the user when the user is wearing said glasses;

a glasses transceiver being integrated into said frame, said glasses transceiver being electrically coupled to said glasses control circuit, said glasses transceiver being in wireless communication with said firearm transceiver such that said glasses transceiver receives said targeting signal, said glasses control circuit comparing said targeting signal with said viewing signal to determine a target of said firearm; and a glasses power supply being integrated into said frame, said glasses power supply being electrically coupled to said glasses control circuit, said glasses power supply comprising at least one rechargeable battery; and a display unit being integrated into said glasses, said display unit being in communication with said glasses motion sensor, said display unit projecting a dot onto a respective one of said lenses having said dot corresponding to said viewing axis of said glasses wherein said display unit is configured to display precisely where the bullet fired from said firearm will strike, said display unit being integrated into a respective one of said lenses, said display unit being comprised of translucent material wherein said display unit is configured to facilitate the user to see through said display unit, said display unit being electrically coupled to said glasses control circuit, said display unit displaying said dot at a location which corresponds to said target of said firearm which was determined by said glasses control circuit.

7. A real time aiming system for displaying a targeting dot on an article of eyewear while operating a firearm, said system comprising:

a firearm having a barrel and a grip;

a firearm motion sensor being integrated into said firearm, said firearm motion sensor being calibrated to sense a firing axis of said barrel wherein said firearm motion sensor is configured to determine the target of said firearm, said firearm motion sensor comprising:

a target control circuit being integrated into said firearm;

a pressure sensor being integrated into said grip wherein said pressure sensor is configured to sense when the user is gripping said grip for operating said firearm, said pressure sensor being electrically coupled to said target control circuit;

a target accelerometer being integrated into said firearm, said target accelerometer sensing acceleration about nine different axis, said target accelerometer being electrically coupled to said target control circuit, said target control circuit analyzing acceleration data from said target accelerometer to generate a target signal wherein said target control circuit is configured to determine where a bullet fired from said firearm will strike;

a firearm transceiver being integrated into said firearm, said firearm transceiver being electrically coupled to said target control circuit, said firearm transceiver broadcasting said targeting signal received from said target control circuit; and a firearm power supply being integrated into said firearm, said firearm power supply being electrically coupled to said target control circuit, said firearm power supply comprising at least one battery;

a pair of glasses being wearable on a user's face, said pair of glasses having a frame, a pair of temples and a pair of lenses, each of said lenses being comprised of a translucent material wherein said pair of lenses is configured to facilitate the user to see through said lenses;

a glasses motion sensor being integrated into said pair of glasses, said glasses motion sensor being calibrated to sense a viewing axis of said pair of glasses wherein said glasses motion sensor is configured to determine the line of said of the user, said glasses motion sensor comprising:

a glasses control circuit being integrated into said frame;

an aiming accelerometer being integrated into said frame, said aiming accelerometer sensing acceleration about nine different axis, said aiming accelerometer being electrically coupled to said glasses control circuit, said glasses control circuit analyzing acceleration data from said aiming accelerometer to generate a viewing signal wherein said glasses control circuit is configured to determine the line of sight of the user when the user is wearing said glasses;

a glasses transceiver being integrated into said frame, said glasses transceiver being electrically coupled to said glasses control circuit, said glasses transceiver being in wireless communication with said firearm transceiver such that said glasses transceiver receives said targeting signal, said glasses control circuit comparing said targeting signal with said viewing signal to determine a target of said firearm; and a glasses power supply being integrated into said frame, said glasses power supply being electrically coupled to said glasses control circuit, said glasses power supply comprising at least one rechargeable battery; and a display unit being integrated into said glasses, said display unit being in communication with said glasses motion sensor, said display unit projecting a dot onto a respective one of said lenses having said dot corresponding to said viewing axis of said glasses wherein said display unit is configured to display precisely where the bullet fired from said firearm will strike, said display unit being integrated into a respective one of said lenses, said display unit being comprised of translucent material wherein said display unit is configured to facilitate the user to see through said display unit, said display unit being electrically coupled to said glasses control circuit, said display unit displaying said dot at a location which corresponds to said target of said firearm which was determined by said glasses control circuit.

* * * * *